Figure 3:
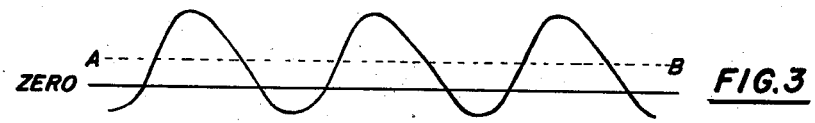

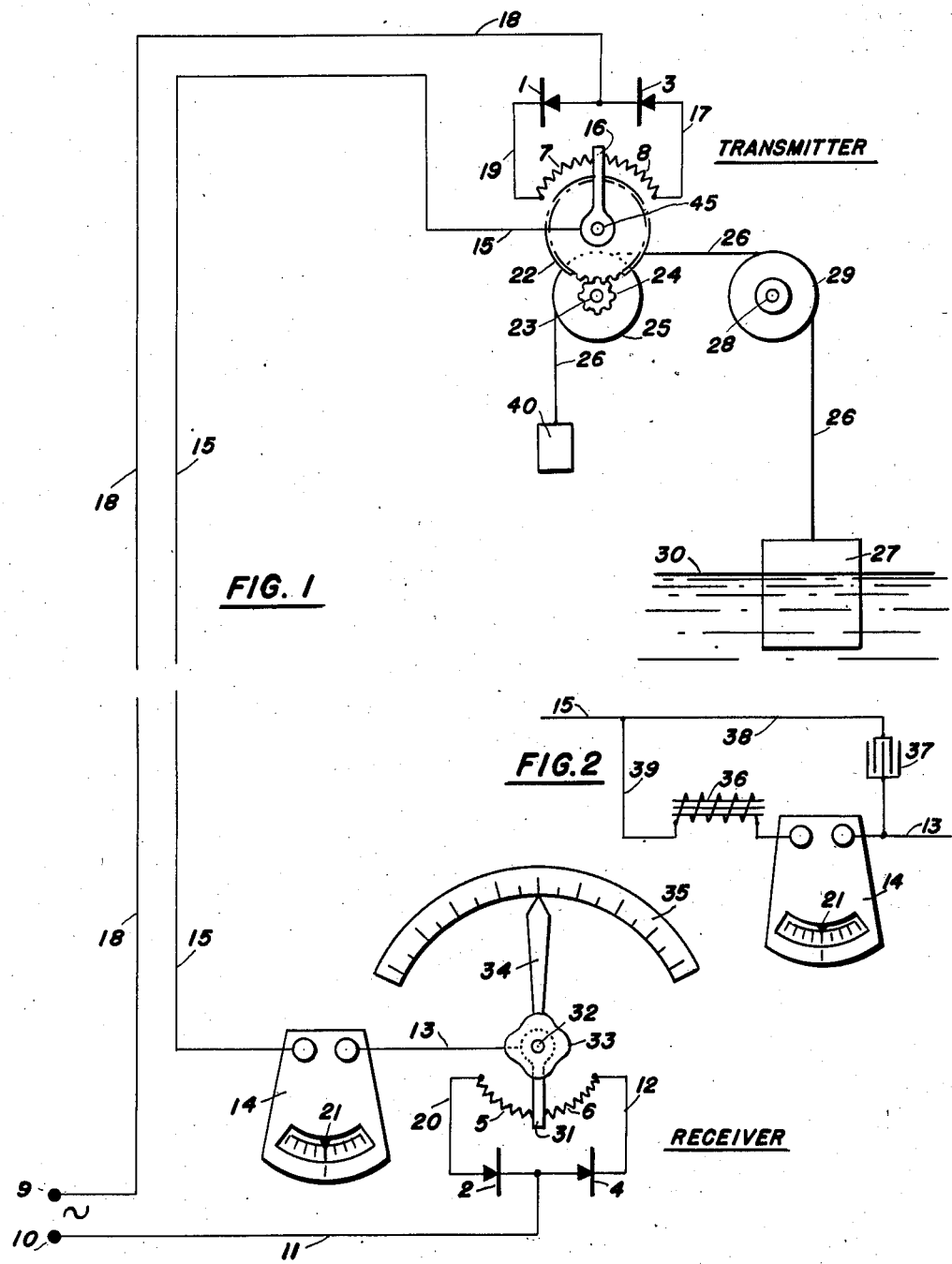

Patented Feb. 18, 1941

2,232,288

UNITED STATES PATENT OFFICE 2,232,288

TELEMETERING SYSTEM

Fritz Frederick Uehling, Passaic, N. J.

Application March 7, 1939, Serial No. 260,255

9 Claims. (Cl. 177—351)

This invention relates to improvements in telemetering systems in which the transmitter may be located at almost any distance from the receiver, said system utilizing a basically novel method of measuring a variable condition, which comprises primarily, changing at the transmitter end of the system the ratio of the magnitudes of the two components of opposite polarity of an alternating current in proportion to changes in the condition, and reestablishing unity for said ratio at the receiving end of the system. More particularly two rectifiers are utilized at a given point in a circuit of alternating current for separating the negative half waves from the positive half waves of said current while the ratio of the amplitudes of said half waves of opposite polarity is varied in proportion to changes in the condition. The negative and positive half waves are then brought together and transmitted to another point in the circuit where by means of two similar rectifiers said two half waves of opposite polarity are again separated after which the ratio of the respective amplitudes of said half waves is readjusted to unity by changing the relative resistances to the flow of current through said last mentioned rectifiers. The manner in which the two pairs of rectifiers are respectively applied at different points in such a circuit, the manner in which the ratio of the current flowing through the two rectifiers of the first pair is varied in proportion to changes in the condition, and the manner in which the relative resistances to the flow of current through the two rectifiers of the second pair is changed to reestablish a ratio of unity for the respective currents of opposite polarity is fully covered by the following specification.

Figures 1 and 2 illustrate diagrammatically all of the principal elements of the invention and their interelectrical connections; Figures 3, 4, 5 and 6 are reproductions of actual oscillograms showing changes in the wave forms of the current in certain parts of the system under different conditions.

In the particular form of the invention as herein described, the transmitter consists primarily of a rectifier 1 in series with a resistance 7 for transmitting alternating current half waves of one polarity, and a rectifier 3 in series with a resistance 8 for transmitting alternating current half waves of the opposite polarity. The resistances 7 and 8 together constitute a slide-wire over which a brush 16 is free to slide from one end to the other, the position of the brush being determined by the magnitude of the condition in a manner to be presently described. The position of the brush 16 obviously determines the ratio of the length of that portion of the slide-wire on one side of the brush to the length of that portion of the slide-wire on the other side of the brush. In other words the position of the brush 16 determines the ratio of the resistance 7 to the resistance 8. The brush also serves to conduct both of said half waves of opposite polarity which half waves as stated are respectively transmitted through the rectifiers 1 and 3, said brush and rectifiers being respectively connected with a source of alternating current through wires 15 and 18, as illustrated. Similarly the receiver consists primarily of a rectifier 2 in series with a resistance 5 for transmitting said alternating current half waves of the one polarity, and a rectifier 4 in series with a resistance 6 for transmitting said alternating current half waves of the opposite polarity. The resistances 5 and 6 constitute a slide-wire over which a brush 31 is free to slide from one end to the other. The position of the brush 31 similarly determines the ratio of the length of that portion of the slide-wire on one side of the brush to that portion of the slide-wire on the opposite side of the brush. In other words the position of the brush 31 determines the ratio of resistance 5 to resistance 6. The brush 31 also serves to conduct both of said half waves of opposite polarity, the alternating current through the brush and the rectifiers being supplied by wires 11 and 13. The brush 31 is mounted on a rotatable shaft 32 supported by suitable bearings not shown. A knob 33 for changing the position of the brush 31 is also fastened to said shaft while a pointer 34 which is fastened to the knob moves concentrically with said brush, the position of said pointer with respect to a fixed scale 35 thus determining the position of the brush.

Figure 4:
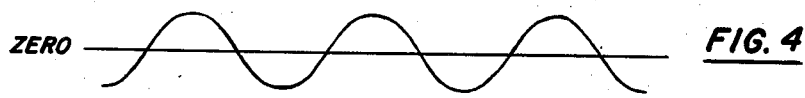
Figure 5:
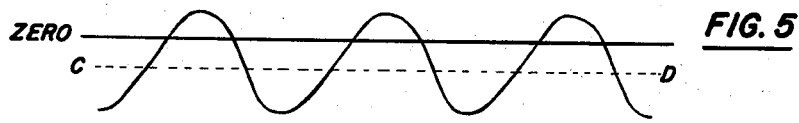

All of the aforesaid resistances and rectifiers are included in a circuit with a source of alternating current 9—10 from which source the half waves of the one polarity are conducted through wire 18 to rectifier 1, from said rectifier through wire 19 and resistance 7 to brush 16, from the brush through wire 15 to a direct current ammeter 14, from the ammeter through wire 13 to brush 31, from the brush 31 through resistance 5 and wire 20 to the rectifier 2 and thence through wire 11 back to the source. Similarly said half waves of the opposite polarity are conducted from the source 9—10 through wire 11 to the rectifier 4, from said rectifier through wire 12 and resistance 6 to the brush 31, from the brush 32 through wire 13 to the direct current ammeter 14, from the ammeter through wire 15 to the brush 16, from the brush 16 through resistance 8 and wire 17 to the rectifier 3 and from said rectifier through wire 18 back to the source. It is obvious from the above that if the combined resistance of the resistance 5 of the receiver and the resistance 7 of the transmitter is equal to the combined resistance of the resistance 6 of the receiver and the resistance 8 of the transmitter then the amplitude of the negative half waves from the source of alternating current will equal the amplitude of the positive half wave from said source, in which case the combined effect of said half waves of opposite polarity on the direct current ammeter 14 will be zero and the indicating needle of said ammeter will remain in its zero or balanced position as illustrated. In other words when the ratio of the negative current resistance to the positive current resistance is equal to unity there will be no direct current component in which case the indicating needle of the meter will be unaffected. On the other hand if the combined resistance of 6 and 8 is greater than the combined resistance of 5 and 7 then the amplitude of one of said half waves of opposite polarity will be greater than that of the other polarity thus causing the indicating needle of the ammeter 14 to deflect in one direction, and similarly if the combined resistance of 6 and 8 is less than the combined resistance of 5 and 7 then the amplitude of the other of said half waves of opposite polarity will be greater and said indicating needle will deflect in the opposite direction. In other words when the current flowing through the ammeter in a positive direction has a greater magnitude than the current flowing in a negative direction the indicating needle will be deflected in one direction and conversely when the current in a negative direction has a greater magnitude than the current in a positive direction, said indicating needle will be deflected in the opposite direction. It is obvious however that in either case the brush 31 of the receiver may be manually adjusted by means of the knob 33 to reestablish unity for the ratio between the resistance to the flow of current in one direction and the resistance to the flow of current in the opposite direction in which case the needle of the ammeter will again assume its normal or balanced position as illustrated. As above stated when the resistance to the flow of negative half wave current is the same as the resistance to the flow of positive half wave current, as determined by the relative positions of the brushes 31 and 16, then the amplitude of the half waves of opposite polarity will be the same. This condition is illustrated in Figure 4. In other words when the amplitudes of the half waves of opposite polarity are equal there will be no direct current component, and the needle of the ammeter will remain in its zero position as illustrated. On the other hand if the relative positions of the brushes 16 and 31 are such that the resistance to the flow of the negative half wave current is greater than the resistance to the flow of positive half wave current, then the current flowing through the ammeter 14, Figure 1, may be represented as in Figure 3 in which case there will be a positive direct current component the mean of which is represented by the dotted line A—B. This direct current component will obviously cause the needle of the ammeter to deflect in a given direction. Similarly if the relative positions of the brushes 16 and 31 are such that the resistance to the flow of the positive half wave current is greater than the resistance to the flow of the negative half wave current, then the current flowing through the ammeter, Figure 1, may be represented as in Figure 5 in which case there will be a negative direct current component the mean of which is represented by the dotted line C—D. This direct current component will obviously cause the needle of the ammeter to deflect in the opposite direction. Figures 3, 4 and 5 are reproductions of actual oscillograms of the current flowing through the ammeter of the particular circuit illustrated in Figure 1.

In the particular form of the invention illustrated, the position of the brush 16 of the transmitter is varied in proportion to changes in the level of a liquid 30 in any form of container not shown. Such a variable level, for example, may be that caused by changes in the tide, or by changes in the depth of water in a river, reservoir or tank. In such a case a float 27 is provided to furnish the power which actuates the brush 16, said power being transmitted over a pulley 29 to a second pulley 25 by means of a flexible cable 26. A weight 40 is fastened to the other end of the cable said weight reacting with the weight of the float to maintain the cable 26 in a taut condition. The pulley 25 is fastened to a properly mounted rotatable shaft 23 to which is also fastened a pinion 24. A rotatable shaft 45 to which the brush 16 is fastened also carries a gear 22 which meshes with the pinion 24. It thus follows that as the level of the liquid 30 falls the brush 16 will move counter-clockwise to decrease the resistance 7 and simultaneously increase the resistance 8, and similarly as the level of said liquid rises the brush 16 will move clockwise to increase the resistance 7 and simultaneously decrease the resistance 8. As previously stated, so long as there exists a ratio of unity between the resistance to the flow of current through the rectifiers 1 and 2, and the resistance to the flow of current through the rectifiers 3 and 4, so long will the half waves of opposite polarity have the same amplitude, as in Figure 4, in which case the current flowing through the ammeter 14, Figure 1, will have no direct current component and the indicating needle of said meter will remain at its zero or balanced position as illustrated. On the other hand it is obvious that any change in the position of the brush 16 of the transmitter as caused by the float 27 will cause a corresponding change in the ratio of the current flowing through the ammeter 14 in one direction to the current flowing through said ammeter in the opposite direction, said change, in the manner stated, causing the needle 21 of the ammeter 14 to deflect from its normal position. Furthermore said change in the ratio of the alternating currents of opposite polarity can be readjusted to unity by changing the position of brush 31 of the receiver so that the combined resistance of resistances 5 and 7 again equals the combined resistances of 6 and 8. Let us assume for example that the level of liquid 30 has fallen in which case the weight of the float 27 will have caused the brush 16 of the transmitter to move counter-clockwise thus decreasing resistance 7 and increasing resistance 8. In such a case the combined resistance of 7 and 5 which is in series with rectifiers 1 and 2 will be decreased, and the combined resistance of 8 and 6 which is in series with rectifiers 3 and 6 will be increased. This change in the ratio of the resistances to the flow of current in opposite directions will increase the amplitude of the positive half waves and decrease the amplitude of the negative half waves as illustrated in Figure 3, with a resulting direct current component the mean value of which as previously stated is represented by the dotted line A—B. The magnitude of said direct current component will obviously depend upon the relative amplitudes of said half waves of opposite polarity and will cause a deflection of the needle 21 in a given direction. To readjust the needle 21 to its zero or balanced position the brush 31 of the receiver must therefore be moved counter-clockwise. This is accomplished by means of the knob 33 which simultaneously moves the pointer 34 with respect to the scale 35. The brush 31 is thus moved in said direction until the needle of the ammeter 14 again coincides with its zero or normal position in which position of said needle the brush 31 will have been moved to a new position in which the combined resistance of 5 and 7 again equals the combined resistance of 6 and 8, thus again equalizing the amplitudes of the two half waves of opposite polarity as illustrated in Figure 4. In other words for every drop in the measured level of the liquid, the indicating needle 21 of the ammeter will be thrown out of balance in a given direction. The knob 33 may then be turned to move the brush 31 and the pointer 34 counter-clockwise until the needle 21 has again assumed its zero or balanced position as illustrated at which time the position of the pointer 34 with respect to the scale 35 will be a measure of the lower level of the liquid. Similarly if the level of the liquid 30 has risen thus causing a higher position of the float 27, then the force of the weight 40 will have caused the brush 16 of the transmitter to move clockwise to increase the resistance 7 and simultaneously decrease the resistance 8. In such a case the combined resistance of 7 and 5 which is in series with the rectifiers 1 and 2 will be increased and the combined resistance of 8 and 6 which is in series with the rectifiers 3 and 4 will be decreased. This change in the ratio of the resistances to the flow of current in opposite directions will decrease the amplitude of the positive half waves and increase the amplitude of the negative half waves as illustrated in Figure 5, with a resulting direct current component the mean value of which is represented by the dotted line C—D. The magnitude of said direct current component will obviously depend upon the relative amplitudes of said half waves of opposite polarity and will cause a deflection of the needle 21 in the opposite direction. To readjust the needle 21 to its zero or balanced position, the brush 31 of the receiver must be moved clockwise. This is accomplished by means of the knob 33 which simultaneously moves the pointer 34 with respect to the scale 35. The brush 31 is thus moved clockwise until the needle of the ammeter 14 again assumes its zero or balanced position in which position of the needle the brush 31 will have been moved to a new position in which the combined resistance of 5 and 7 again equals the combined resistance of 6 and 8, thus again equalizing the amplitudes of the two half waves of opposite polarity as illustrated in Figure 4. In other words for every increase in the measured level of the liquid, the indicating needle 21 of the ammeter will be thrown out of balance in the opposite direction. The knob 33 may then be turned to move the brush 31 and the pointer 34 clockwise until the needle 21 has again assumed its zero or balanced position at which time the position of the pointer with respect to the scale 35 will be a measure of the higher level of the liquid. It thus follows that whenever the knob 33 is adjusted to bring the needle 21 of the ammeter to its zero or balanced position the pointer 34 will indicate the depth of the liquid on the scale 35 which may be calibrated in any desirable units.

Figure 6:
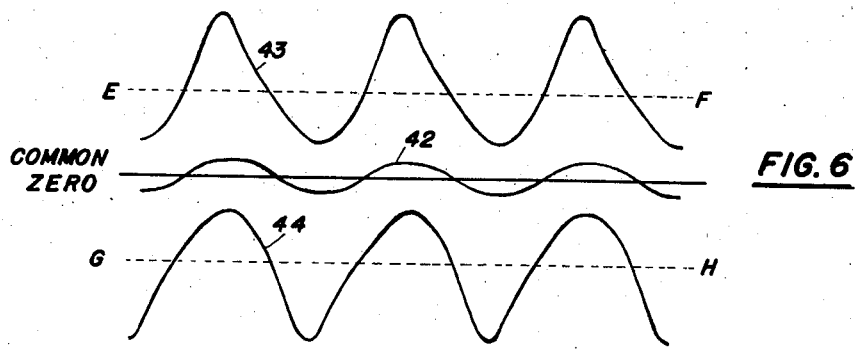

Although the measuring system above described, and as illustrated in Figure 1, covers the fundamental principle involved, definite advantages are gained when the major portion of the alternating current component is by-passed around the ammeter 14 as for example through a condenser 37 as illustrated in Figure 2. Shunting the alternating current around the ammeter is desirable firstly, because the alternating current component of the current passing through the system is of no value in deflecting the needle 21 of the direct current ammeter 14, and secondly, because the shunting of the alternating current component around said meter greatly reduces the current burden on the coil and hair springs of the ammeter and therefore permits the use of a more sensitive instrument for measuring the direct current component. The high degree of sensitivity of the ammeter which may be used under these conditions will be presently referred to. The condenser 37 is of the proper capacity to permit nearly all of the alternating current to pass around the ammeter, and since the condenser will not pass direct current it is obvious that all of the direct current component of the current flowing through the system will still pass through the ammeter. An impedance in the form of a choke 36, Figure 2, is also placed in series with the ammeter to minimize the amplitude of that small portion of the alternating current which does pass through said meter. Reproductions of actual oscillograms, made of the current passing through the ammeter with the condenser 37 shunting nearly all of the alternating current around the meter as above stated, are illustrated in Figure 6 in which each of the three oscillograms 42, 43 and 44 are referred to a common zero. Said three oscillograms represent respectively the current flowing through the ammeter first, when said meter is balanced in which case there will be no direct current component, second, when the meter is out of balance in a positive direction in which case the mean direct current component is represented by the dotted line E—F, and third, when the meter is out of balance in a negative direction in which case the mean direct current component is represented by the dotted line G—H. In the manner previously described, when the indicating needle of the ammeter is in its balanced or normal position as illustrated, then the combined resistance of 7 and 5 must equal the combined resistance of 8 and 6 in which case the amplitude of the half waves of the one polarity will equal the amplitude of the half waves of the opposite polarity. Under these conditions there will be no direct current component and only alternating current will flow through the system, the major portion of which will flow around the ammeter 14 through the condenser 37, Figure 2, while the remaining portion of said current which is small passes through the meter 14 and the impedance 36 as represented by the oscillogram 42, Figure 6. This condition will obviously always exist when the brush 31 of the receiver has been moved, by means of the knob 33, to a point where the combined resistance of 7 and 5 equals the combined resistance of 8 and 6, or in other words when the ratio of the resistance to the flow of current in one direction to the resistance to the flow of current in the opposite direction equals unity. Under this condition the needle of the ammeter will rest at its zero or balanced position and the pointer 34 will register the level of the liquid 30. On the other hand if the level of the liquid 30 has changed to move the brush 16 of the transmitter counter-clockwise thus decreasing the resistance 7 and simultaneously increasing the resistance 8, then the resistance to the flow of the positive half waves through the rectifiers 1 and 2 will have decreased, and the resistance to the flow of the negative half waves through the rectifiers 3 and 4 will have increased, the difference between the amplitudes of the two half waves of opposite polarity determining the magnitude of the direct current component. In such a case due to the shunting of the alternating current through the condenser 37, Figure 2, the current which flows through the ammeter 14 will be all direct current of positive polarity as shown by the oscillogram 43, Figure 6. The ammeter will thus be deflected by said direct current, the mean value of which is represented by the dotted line E—F. To reestablish a balanced condition the brush 31 of the receiver must obviously also be moved in a counter-clockwise direction to increase the resistance 5 and simultaneously decrease the resistance 6 until the combined resistance of 7 and 5 again equals the combined resistance of 6 and 8. This is accomplished by turning the knob 33 until the needle 21 of the ammeter has again assumed its zero or normal position at which time the pointer 34 will indicate the new level on the scale 35. Similarly if the level of the liquid 30 has changed to move the brush 16 of the transmitter clockwise thus decreasing the resistance 8 and simultaneously increasing the resistance 7, then the resistance to the flow of the positive half waves through the rectifiers 1 and 2 will have increased, and the resistance to the flow of the negative half waves through rectifiers 3 and 4 will have increased, the difference between the amplitudes of the two half waves of opposite polarity determining the magnitude of the direct current component. Due however to the shunting of the alternating current through the condenser 37, Figure 2, the current flowing through the ammeter 14 will be all direct current of negative polarity as shown by the oscillogram 44, Figure 6. The ammeter will therefore be deflected in the opposite direction by said direct current, the mean value of which is represented by the dotted line G—H. To reestablish a balanced condition the brush 31 of the receiver must now be moved in a clockwise direction to decrease the resistance 5 and simultaneously increase the resistance 6 until the combined resistance of 7 and 5 again equals the combined resistance of 8 and 6. This is similarly accomplished by turning the knob 33 until the needle 21 of the ammeter has again assumed its zero or normal position at which time the pointer 34 will again indicate the new level of the liquid.

It follows from the above that in spite of the fact that the alternating current is shunted around the ammeter, the total direct current component as determined by the difference in the amplitudes of the two half waves of opposite polarity will always flow through the ammeter. However since the alternating current constitutes the major portion of the current flowing through the system it is obvious that the ammeter which responds only to direct current can be designed for a far greater degree of sensitivity than would be possible if all of the current passed through said meter. In an actual application to demonstrate the practicability of this method of measuring changes in a condition, ordinary commercial 110 volt 60 cycle alternating current was applied at 9—10, Figure 1, and the resistance of the connecting lines 11, 15 and 18 was made 5000 ohms which, if No. 12 copper wire were used for said connections, would be the equivalent of approximately 500 miles between the transmitter and receiver. In this particular demonstration the resistance of the slide-wire at the transmitter which, as previously stated, constitutes the combined resistance of 7 and 8 was made equal to the resistance of the slide-wire at the receiver which constitutes the combined resistance of 5 and 6. The actual resistance of each of said slide-wires was made approximately 100 ohms which is obviously a very small part of the total resistance which includes the 5000 ohms mentioned. It follows therefore that the direct current component of the current flowing through the system will be in the order of microamperes, its magnitude, in the manner previously stated being determined solely by the relative position of the brushes 16 and 31. However since the resistance of the connecting lines between the transmitter and receiver is included in the resistance to the flow of current in either direction it is obvious that in the particular case recited it is the difference between the combined resistance of the connecting lines (5000 ohms) plus the resistances 5 and 7, and the combined resistance of said connecting lines plus the resistances 6 and 8 as determined by the relative positions of the brushes 16 and 31 which fixes the magnitude of the direct current component. The ammeter used in this specific case actually required less than 200 microamperes of direct current for full scale deflection. An instrument with this sensitivity was obviously possible because, as previously stated the alternating current which is shunted around the ammeter through the condenser 37 represents by far the greater portion of the current passing through the system. The burden of this alternating current component on the ammeter is thus entirely eliminated while the full value of any direct current component will always flow through the ammeter to deflect the needle 21 in one direction or the other when the system is out of balance. Due to the fact that the potential applied at the source 9—10 is the same for the current flowing in either direction, it is further obvious that changes in the voltage applied at 9—10 will not affect the balanced position of the pointer 34. In the demonstration above mentioned the voltage applied at the source was varied between 25 and 110 without the slightest effect on the accuracy of the readings. Similarly any change in the resistance of the connecting lines between the transmitter and receiver will not affect the balanced position of the pointer 34. This is obviously due to the fact that said resistance is the same to the flow of current in either direction. To demonstrate this fact the resistance of said connecting lines was varied between 3000 and 6000 ohms without affecting the accuracy of the reading.

Although the particular form of the invention as herein described is confined to the measurement of changes in level it is obvious that changes in any condition which are capable of being utilized to effect a change in the ratio of two resistances may be applied under this system to measure a magnitude subject to said changes without in any way departing from this invention.

I claim:

1. In a device for measuring the magnitude of a condition, the combination with a circuit which includes a source of alternating current, of means controlled by the magnitude of the condition for changing the ratio of the amplitudes of the half waves of opposite polarity from said source, a variable resistance for changing the amplitude of the half waves of one polarity independently of changes in the magnitude of the condition, a second variable resistance in parallel with the first for changing the amplitude of the half waves of opposite polarity independently of changes in the magnitude of the condition, a direct current meter in series with said parallel resistances for measuring the direct current component resulting from a difference in the amplitudes of said half waves of opposite polarity, and means for changing the relative magnitudes of said resistances to eliminate the direct current component as measured by said ammeter.

2. In a device for measuring the magnitude of a condition, the combination with a source of alternating current, of a pair of rectifiers in parallel with each other, the first of said rectifiers for conducting current in one direction and the second for conducting current in the opposite direction, a second pair of rectifiers consisting of a third and a fourth rectifier each in parallel with the other, the third rectifier for conducting current in the said one direction and the fourth rectifier for conducting current in the said opposite direction, a circuit which includes in series the source of alternating current, the first pair of rectifiers and the second pair of rectifiers, means controlled by the magnitude of the condition for changing the ratio of the current flowing through the first and third rectifiers to that flowing through the second and fourth rectifiers, a direct current ammeter in the circuit in series with both pairs of parallel rectifiers for measuring the difference between the currents flowing through the circuit in opposite directions, independent means for changing said ratio, and means for adjusting said independent means to establish a reading of zero on the ammeter.

3. In a device for measuring the magnitude of a condition, the combination with a source of alternating current, of a pair of rectifiers in parallel with each other, the first of said rectifiers for transmitting current in one direction and the second of said rectifiers for transmitting current in the opposite direction, a second pair of rectifiers consisting of a third and a fourth rectifier each in parallel with the other, the third rectifier for transmitting current in the said one direction and the fourth rectifier for transmitting current in the said opposite direction, a circuit which includes in series the source of alternating current, said first pair of rectifiers and said second pair of rectifiers, a resistance in series with the first rectifier and in parallel with the second rectifier, a second resistance in series with the second rectifier and in parallel with the first rectifier, means for changing the ratio of said resistances in proportion to changes in the magnitude of the condition, a third resistance in series with the third rectifier and in parallel with the fourth rectifier, a fourth resistance in series with the fourth rectifier and in parallel with the third rectifier, means for changing the ratio of said third and fourth resistances, and means for indicating any direct current component of the current flowing through the circuit.

4. In a device for measuring the magnitude of a condition, the combination with a loop consisting of a slide-wire, and two rectifiers all in series with each other, a brush slidably mounted on said slide-wire, a second loop consisting of a second slide-wire, a third rectifier and a fourth rectifier all of which are in series with each other, a second brush slidably mounted on the second slide-wire, a conductor for electrically connecting said brushes, a second conductor for electrically connecting a point between the first and second rectifiers with one side of a source of alternating current, a third conductor for electrically connecting a point between the third and fourth rectifiers with the other side of the source of alternating current thus completing a circuit which includes said source, the first and second rectifiers in parallel, and the third and fourth rectifiers in parallel, means included in the conductor which connects the two brushes for indicating any direct current component of the current flowing through said circuit, means for changing the position of the first brush with respect to the first slide-wire in proportion to changes in the magnitude of the condition, and means for changing the position of the second brush with respect to the second slide-wire to eliminate any direct current as indicated by said indicating means.

5. In a device for measuring the magnitude of a condition, the combination with a loop consisting of a slide-wire, and two rectifiers all of which are in series with each other, a brush slidably mounted on said slide-wire, a second loop consisting of a slide-wire, a third rectifier and a fourth rectifier all of which are in series with each other, a second brush slidably mounted on the second slide-wire, an electrical connection between said brushes, an electrical connection from a point between the first and second rectifiers to one side of a source of alternating current, and an electrical connection from a point between the third and fourth rectifiers to the other side of the source of alternating current thus completing a circuit which includes said source, the first and second rectifiers in parallel, and the third and fourth rectifiers in parallel, a direct current ammeter included in said connection between the two brushes for measuring any direct current component of the current flowing through the circuit, a condenser shunted across the ammeter for by-passing alternating current around the ammeter, means for changing the position of the first brush with respect to the first slide-wire in proportion to changes in the magnitude of the condition, and means for changing the position of the second brush with respect to the second slide-wire to eliminate any direct current as indicated by said ammeter.

6. A device for measuring the magnitude of a condition consisting of a circuit which includes a source of alternating current, a divider in the circuit consisting of a slide-wire and a brush slidably mounted thereon for dividing the slide-wire into two parts the first part of which is connected in series with a rectifier for conducting current in one direction and the second part of which is connected in series with a second rectifier for conducting current in the opposite direction, said first rectifier and said first part of the slide-wire being connected in parallel with said second rectifier and said second part of the slide-wire, a second divider in the circuit consisting of a second slide-wire and a second brush slidably mounted thereon for dividing the slide-wire into two parts the first part of which is connected in series with a third rectifier for conducting current in the said one direction and the second part of which slide-wire is connected in series with a fourth rectifier for conducting current in the said opposite direction said third rectifier and the first part of said second slide-wire being connected in parallel with said fourth rectifier and the second part of said second slide-wire, a direct current ammeter connected between the brushes of the dividers for measuring any direct current component of the current passing through the circuit, an impedance in series with the ammeter, a condenser in parallel with both the ammeter and the impedance for shunting alternating current around the ammeter, means controlled by changes in the magnitude of the condition for changing the position of the first brush to change the ratio of the currents flowing through the first and second rectifiers, independent means for changing the position of the second brush to equalize the current flowing through the circuit in opposite directions, a pointer in geared connection with the second brush, and a fixed scale calibrated in units of magnitude of the condition for determining the position of the second brush when said direct current component as measured by the ammeter is zero.

7. In a device for measuring the magnitude of a condition, the combination with a slide-wire, of a slide-wire brush in contact therewith and slidably mounted to move from either end of the slide-wire to the other, two half wave rectifiers the positive terminal of the first of which is connected with one end of the slide-wire and the negative terminal of the second of which is connected with the other end of the slide-wire, a conductor which electrically connects the remaining terminals of said rectifiers and one side of a source of alternating current, a second slide-wire, a second slide-wire brush in contact therewith and slidably mounted to move from either end of said slide-wire to the other, a third half wave rectifier the negative terminal of which is connected with one end of said second slide-wire, a fourth half wave rectifier the positive terminal of which is connected with the other end of the second slide-wire, a second conductor which electrically connects the remaining terminals of said third and fourth rectifiers with the other side of said source of alternating current, and a direct current ammeter connected between said brushes for indicating direct current of either negative or positive polarity.

8. In a device of the class described, the combination with a circuit which includes a pair of resistances connected in parallel with means for passing current through the first of said resistances in one direction only and means for passing current through the second of said resistances in the opposite direction only, and a second pair of resistances connected in parallel with means for passing current through one of said second pair of parallel resistances in said one direction only and means for passing current through the other of said second pair of parallel resistances in said opposite direction only, of a direct current meter in series with both of said pairs of resistances, a source of alternating current for supplying energy to the circuit, means controlled by changes in the magnitude of a condition for changing the relative magnitudes of the first pair of resistances, and independent means for changing the relative magnitudes of the second pair of resistances.

9. In a device of the class described, the combination with three pairs of parallel branches of an electric circuit each pair in series with the remaining two pairs, of a rectifier of a given polarity in one branch of the first pair of parallel branches for permitting current to pass through said branch in one direction only, a second rectifier of the opposite polarity in the other branch of the first pair of branches, for permitting current to pass through said other branch in the opposite direction only, a third rectifier of said given polarity in one branch of the second pair of parallel branches for permitting current to pass through said branch in one direction only, a fourth rectifier in the other branch of the second pair of branches for permitting current to pass through said other branch in the said opposite direction only, a direct current meter in series with a choke and included in one branch of the third pair of parallel branches, a condenser in the other branch of the third pair of branches for by-passing alternating current around the meter, a source of alternating current for supplying energy to the circuit, means controlled by changes in a variable condition for changing the relative resistances to the flow of current through the respective branches of the first pair of branches and independent means for changing the relative resistances to the flow of current through the respective branches of the second pair of branches.

FRITZ FREDERICK UEHLING.